Aug. 22, 1939. A. E. RITTENHOUSE ET AL Re. 21,181

SIGNAL DEVICE

Original Filed Nov. 30, 1936

INVENTORS
Arthur E. Rittenhouse
BY Lloyd Rittenhouse
Harold R. Stonebraker,
their ATTORNEY.

Reissued Aug. 22, 1939 Re. 21,181

UNITED STATES PATENT OFFICE 21,181

SIGNAL DEVICE

Arthur E. Rittenhouse and Lloyd Rittenhouse, Honeoye Falls, N. Y., assignors to The A. E. Rittenhouse Co., Inc., Honeoye Falls, N. Y., a corporation of New York Original No. 2,120,153, dated June 7, 1938, Serial No. 113,392, November 30, 1936. Application for reissue May 23, 1939, Serial No. 275,252

7 Claims. (Cl. 177—7)

This invention relates to a signal device, and has to do more particularly with that class of devices in which there is a chime member or vibratable element with which cooperates an electromagnetically operated striker which, when the circuit is closed, moves to engage the vibratable element with a quick impact and strikes a single blow which sets the element in vibration.

The invention has for its object to afford a practical construction that can be manufactured at a relatively low cost and in which all the parts are arranged within a housing, with the result that the vibratable element is protected to a degree against dust and dirt and is less likely to lose a part of its effectiveness.

A further purpose of the invention is to afford a construction permitting a more compact arrangement of the parts than heretofore, while at the same time giving a deeper and more musical tone when the signal is operated.

Another object of the invention is to provide a construction that enables the use of a housing of minimum size in which all the parts are contained, while giving a maximum tone effect when the signal is operated.

Still an additional purpose of the invention is to provide an arrangement by which the structure can be readily manufactured and assembled at a minimum cost, and which also permits easy access and quick removal of the operating parts if necessary for adjustment or repair.

To these and other ends, the invention consists in the combination and arrangement of parts that will appear from the following description when read in conjunction with the accompanying drawing, the novel features being pointed out in the claims following the specification.

Figure 1:
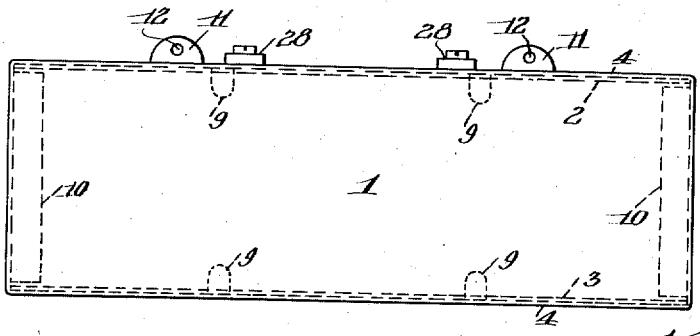
Fig. 1 is a front elevation of a signal device incorporating one embodiment of the invention.
Figure 5:
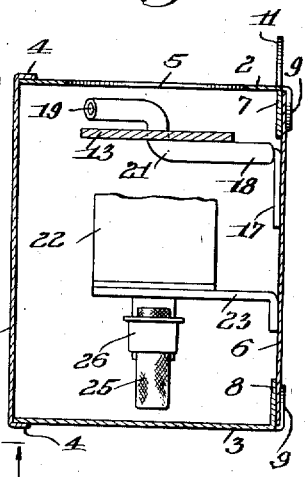
Fig. 5 is a transverse vertical sectional view taken centrally of the electromagnet, and with the upper portion of the latter broken away.

Referring more particularly to the drawing in which like reference numerals refer to the same parts throughout the several views, the structure includes a housing formed preferably of sheet metal or other suitable material, and including a curved front wall 1, top wall 2, and bottom wall 3 which are rigidly and permanently attached to the front wall against the flanges 4 of the latter.

The top wall 2 is provided with a central opening 5 to emit the tones from the resonance chamber afforded by the housing, as will appear presently, while 6 designates the back wall of the housing which is removably secured to the top and bottom walls in the following manner.

Figure 2:
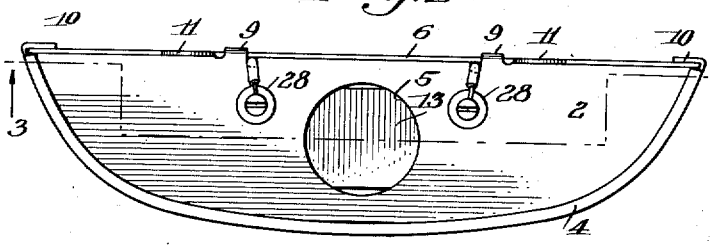
Fig. 2 is a plan view of the same.
Figure 6:
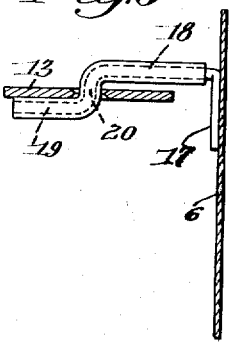
Fig. 6 is a detail sectional view on line 6—6 of Fig. 4.
Figure 3:
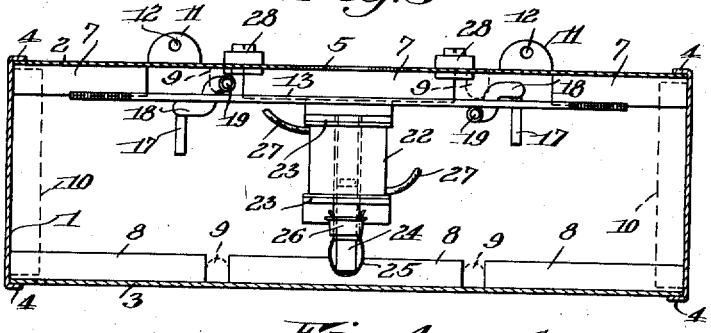
Fig. 3 is a longitudinal vertical sectional view taken on line 3—3 of Fig. 2.

The top wall has a series of depending flanges 7 and the bottom wall has a series of upstanding flanges 8 against which the rear wall 6 is retained, and 9 designates lugs or extensions from the top and bottom walls which are bent over the rear wall 6 to hold it in place against vertical displacement, while endwise movement of the rear wall is prevented by the flanges 10 on the front wall 1, the flanges 10 being bent around the ends of the rear wall 6, as shown in Fig. 2. In this fashion, the rear wall 6 can be quickly assembled, and can also be readily removed from the rest of the housing if necessary to gain access thereto. Lugs 11 extend upwardly from the top wall 2 and have openings 12 therein to permit the housing to be attached to a wall or other support.

The removable back wall 6 constitutes the supporting means for the vibratable element and the electromagnetic striker operating mechanism, as will now be described, so that the operating parts, assembled on the back wall 6, can be secured in operative relation within the housing in a single operation, by affixing the back wall to the housing in the manner already described. 13 designates the vibratable element, preferably in the form of a resonant plate, which is located beneath the opening 5 in the resonance chamber and in right angular relationship to the back wall 6.

The housing is of somewhat elongated form to accommodate a relatively long vibratable element, and in order to obtain maximum vibration of the latter, the vibratable plate 13 is constructed with its rear edge 14 longer than its front edge 15, and connected by converging ends 16 which conform generally to the curvature of the front wall 1 of the housing.

This construction of vibratable plate affords a tone corresponding to the average length of the plate, and of the same pitch as a rectangular plate having a length corresponding to the average of the long and short edges of the plate herein disclosed. Thus the vibratable plate gives a lower pitch and deeper tone than a rectangular plate which could be arranged in a housing of similar size.

The vibratable plate 13 is supported by arms mounted on the back wall 6. Each of said supporting arms includes a vertical portion 17 that is spot-welded or otherwise attached to the back wall. The supporting arms also include horizontal portions 18 and 19, connected by vertical portions 20 extending through openings in the vibratable plate. The horizontal portions 18 overlie and underlie respectively the rear portion of the vibratable plate and the horizontal portions 19 underlie and overlie respectively the front portions of the vibratable plate, the latter resting upon the horizontal portion 18 of one supporting arm and the horizontal portion 19 of the other supporting arm and being held against excessive vertical movement or tilting by the overlying horizontal portions of the arms.

Figure 4:
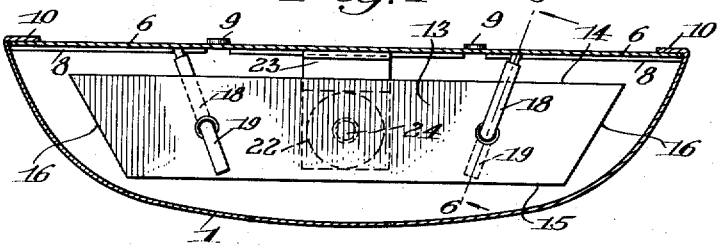
Fig. 4 is a horizontal sectional view taken immediately under the top wall of the housing.

The supporting arms are encased in tubular members 21 of rubber or other suitable material to contact with the vibratable plate, as usual in this class of construction, and in order that maximum vibration of the element may be had, the supporting arms extend across the vibratable plate in the angular relation shown in Fig. 4, converging along lines that form an intermediate angle between the angles of the ends of the vibratable plate and a line directly across the vibratable plate at right angles to its side edges. By this arrangement of the supporting arms at slight angles to the ends of the vibratable plate, a maximum vibration and consequent more effective tone effect is obtained.

The vibratable plate 13 is located somewhat beneath the opening 5, and arranged beneath the vibratable plate 13 and also supported on the back wall 6 is the electromagnetic striker operating mechanism consisting of an electromagnet of conventional form, as designated at 22, the latter being supported between brackets 23 which are spot-welded or otherwise permanently attached to the back wall 6. 24 designates the armature of the electromagnet which also constitutes the striker, and when moved upwardly upon energizing the electromagnet, engages and sets in vibration the plate 13. The armature returns to its inactive position by gravity when the circuit is broken, its downward movement being limited by any suitable instrumentality such as a tape 25 held suitably to the end of the armature housing by a band 26.

27 designates conductors leading from the electromagnet to suitable binding posts 28, from which connections are made to the controlling circuit. When the latter is closed by pushing a button or operating a suitable switch, the armature 24 is moved upwardly and strikes the vibratable plate 13 with a quick impact, immediately falling away therefrom due to the action of the magnet and gravity, and returning entirely to its inoperative position when the circuit is broken. This sets in vibration the plate or vibratable element 13, the tones being emitted through the opening 5.

By locating the vibratable element within the housing, the electromagnet can be arranged closely to the vibratable element so that only a relatively short stroke of the striker or armature is required, lending to a more compact arrangement than in the devices heretofore produced for this same purpose, and the mounting of the vibratable plate and electromagnet upon a removable wall of the housing affords a most economical and practical construction, permitting ready assembly and quick accessibility for servicing when necessary.

While the invention has been described with relation to a particular embodiment, it is not confined to the details herein shown, and this application is intended to cover any changes or departures coming within the purposes of the improvements or the scope of the following claims.

We claim:

1. A signal device comprising a housing affording a resonance chamber having an opening in its top wall, a vibratable plate located within the housing beneath said opening, a plurality of supporting arms for said plate, each of said arms including horizontal portions overlying and underlying the plate and central vertical portions extending through openings in the plate, the underlying portion of one of said arms engaging the inner portion of the plate and the underlying portion of the other of said arms engaging the outer portion of the plate, and electromagnetic striker operating means located within the housing beneath said vibratable plate.

2. A signal device comprising a housing affording a resonance chamber having an opening in its top wall, a vibratable plate located beneath said opening at right angles to the rear wall of the housing, said plate being longer at its rear edge than at its front edge, said housing having a curved front wall conforming generally to the front edge of said plate, supporting arms for said plate attached to said rear wall and including horizontal portions overlying and underlying the plate and central vertical portions extending through openings in the plate, said arms extending across the plate in converging relationship and at slight angles to the ends of the plate, and electromagnetic striker operating means located within the housing beneath said plate.

3. A signal device comprising a housing including top, bottom, and front walls permanently secured together and a removable back wall affording a resonance chamber, the top wall having an opening therein, a vibratable element arranged beneath said opening, supporting means for said vibratable element secured to said removable back wall, and electromagnetic striker operating means arranged beneath said vibratable element and secured to said back wall.

4. A signal device comprising a housing, a vibratable plate, and a plurality of supporting arms for said plate, each of said arms including horizontal portions overlying and underlying the plate and a central vertical portion extending through an opening in the plate.

5. A signal device comprising a housing comprising top, bottom, and front walls permanently secured together, and a removable back wall affording a resonance chamber, the top wall having an opening therein, a vibratable element arranged beneath said opening, supporting means for said vibratable element, and electromagnetic striker operating means arranged beneath said vibratable element and secured to said back wall.

6. A musical chime signal device comprising a closed resonance chamber including top, bottom, and front walls, a vibratable element comprising a plate located within the resonance chamber and spaced from the walls thereof, supporting means engaging the plate at two points and acting to permit vibration of the plate and to prevent bodily swinging movement thereof, and electromagnetic striker operating means arranged within the resonance chamber to actuate a striker against the vibratable plate, one wall of the resonance chamber having an opening therein opposite a portion of said vibratable plate and the vibratable plate being located between said opening and said striker operating means, the area of said opening being considerably less than the area of said plate.

7. A musical chime signal device comprising a closed resonance chamber including top, bottom, front and back walls, said front and back walls being separable one from the other, a vibratable element comprising a plate located within said resonance chamber and spaced from the walls thereof, supporting means engaging the plate at two points and acting to permit vibration of the plate and to prevent bodily swinging movement thereof one wall of the resonance chamber having an opennig opposite a portion of said vibratable plate, and electromagnetic striker operating means arranged within said resonance chamber and carried by said back wall to actuate a striker against the vibratable plate, the vibratable plate being located between said opening and said striker operating means, the area of said opening being considerably less than the area of said plate.

ARTHUR E. RITTENHOUSE.
LLOYD RITTENHOUSE.